United States Patent [19]

Grooms et al.

[11] Patent Number: 5,416,303
[45] Date of Patent: May 16, 1995

[54] METHOD FOR INDUCTION SEALING AN INNER BAG TO AN OUTER CONTAINER

[75] Inventors: John P. Grooms, Cincinnati, Ohio; Larry J. Mattson, Charlotte, N.C.

[73] Assignee: The Proctor & Gamble Company, Cincinnati, Ohio

[21] Appl. No.: 271,806

[22] Filed: Jul. 7, 1994

[51] Int. Cl.⁶ .................................................. H05B 6/10
[52] U.S. Cl. .................................... 219/633; 219/634; 156/69; 156/274.2
[58] Field of Search ............... 219/633, 634, 618, 604, 219/632; 156/69, 273.9, 274.2

[56] References Cited

U.S. PATENT DOCUMENTS

| | | | |
|---|---|---|---|
| 2,743,038 | 4/1956 | Ferries | 222/95 |
| 3,461,014 | 8/1969 | James | 156/272 |
| 3,738,892 | 6/1973 | Curcio | 156/380 |
| 3,788,928 | 1/1974 | Wise | 156/294 |
| 3,808,074 | 4/1974 | Smith et al. | 156/69 |
| 3,945,539 | 3/1976 | Sossong | 222/386.5 |
| 3,981,418 | 9/1976 | Williamson et al. | 222/386.5 |
| 3,988,185 | 10/1976 | Johnson et al. | 156/69 |
| 4,057,444 | 11/1977 | Prot | 156/69 |
| 4,109,815 | 8/1978 | Collins, III | 215/232 |
| 4,152,566 | 5/1979 | Mägerle | 219/633 |
| 4,154,366 | 5/1979 | Acres | 222/95 |
| 4,169,004 | 9/1979 | Kock et al. | 156/227 |
| 4,180,961 | 1/1980 | Collins, III | 53/421 |
| 4,658,989 | 4/1987 | Bonerb | 222/105 |
| 4,704,509 | 11/1987 | Hilmersson et al. | 219/10.53 |
| 4,754,113 | 6/1988 | Mohr et al. | 219/10.79 |
| 4,783,233 | 11/1988 | Yasumuro et al. | 156/69 |
| 4,842,165 | 6/1989 | Van Coney | 222/95 |
| 4,865,224 | 9/1989 | Streck | 222/95 |
| 4,892,230 | 1/1990 | Lynn, Jr. | 222/105 |
| 4,994,637 | 2/1991 | Fang et al. | 219/10.53 |
| 5,013,878 | 5/1991 | Fries, Jr. | 219/633 |
| 5,047,605 | 9/1991 | Ogden | 219/633 |
| 5,145,083 | 9/1992 | Takahashi | 220/206 |
| 5,158,370 | 10/1992 | Jacobi | 383/48 |
| 5,191,181 | 3/1993 | Regenscheid | 219/10.41 |
| 5,198,053 | 3/1993 | Duncan | 156/64 |
| 5,200,587 | 4/1993 | Fang | 219/10.53 |

*Primary Examiner*—Philip H. Leung
*Attorney, Agent, or Firm*—Ronald W. Kock; Michael E. Hilton

[57] ABSTRACT

A process for forming, handling, circumferentially sealing, and inverting a thin plastic half bag to an inwardly tapered, continuous inner side wall of an outer plastic container. A non-metallic mandrel is used as a tool for thermoforming a half bag over the top of the mandrel. The top of the mandrel with bag attached is inserted into an open end of the outer plastic container. A continuous metal ring connected at the circumference of the mandrel, positioned near the open end of the half bag, wedges the bag against the tapered inner side wall of the container near the midpoint of the container to form a sealing interface therebetween. A magnetic induction field generated near the container heats the metal ring on the mandrel. Heat is conducted to the sealing interface to weld the bag to the container. After the field is removed and the metal ring cools, the mandrel with metal ring is withdrawn from the thin plastic bag. Vacuum applied to the closed end of the bag from the top of the mandrel causes the bag to be inverted to the open end of the container as the mandrel is withdrawn.

20 Claims, 2 Drawing Sheets

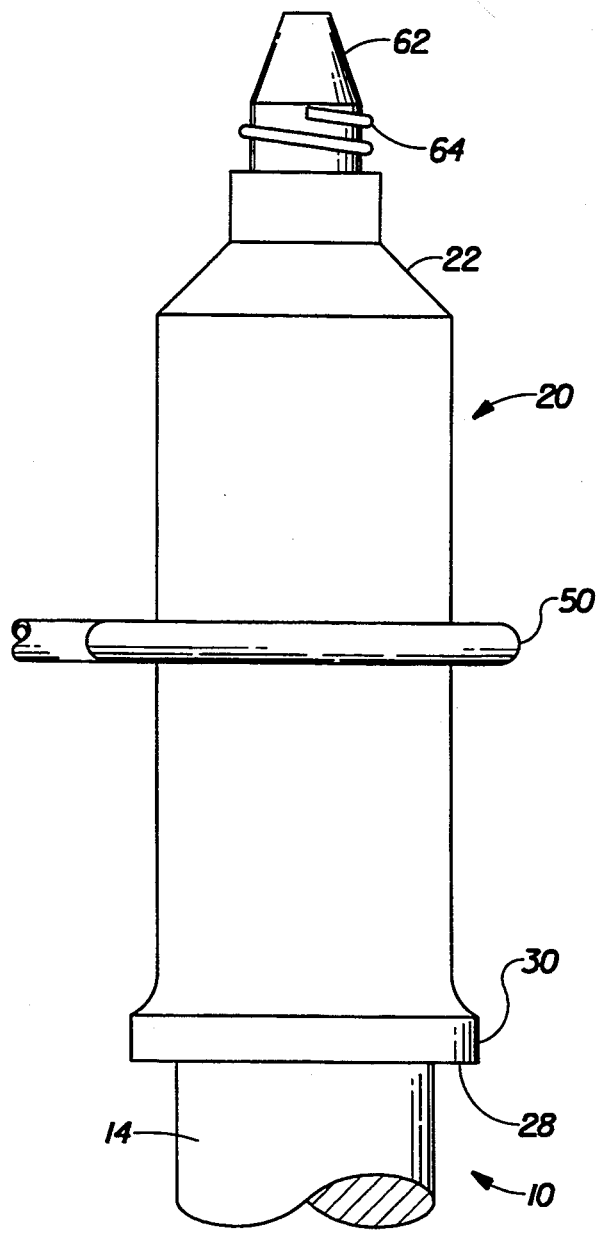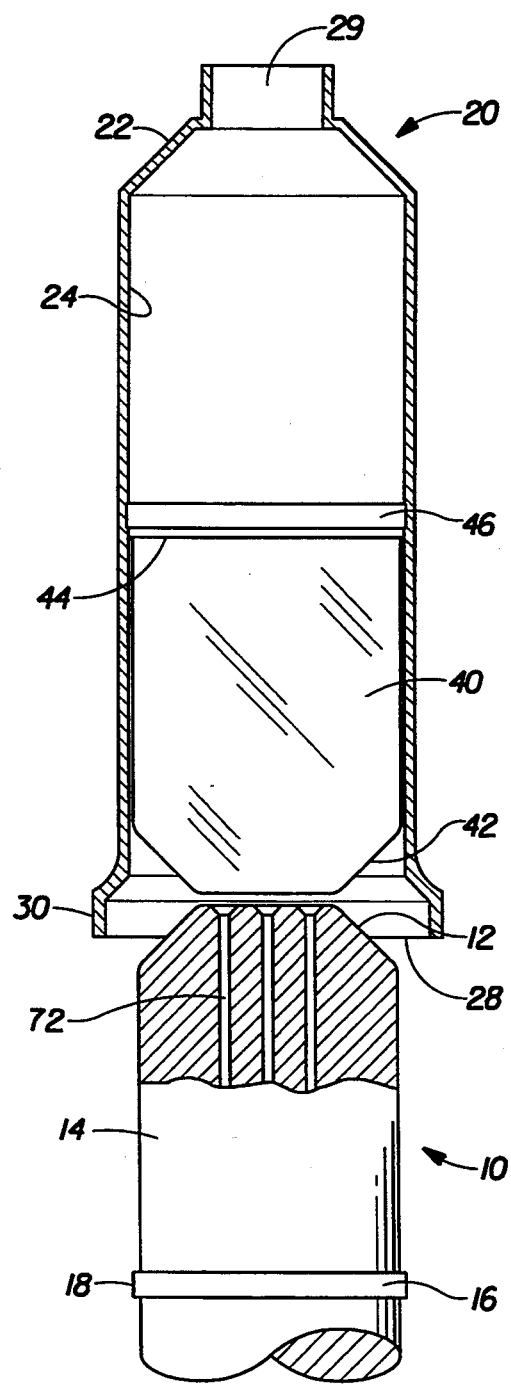
Fig. 4
Fig. 5

METHOD FOR INDUCTION SEALING AN INNER BAG TO AN OUTER CONTAINER

FIELD OF THE INVENTION

The present invention relates to processes for induction sealing plastic parts to each other, and more particularly to such processes wherein a metal component contacting the plastic parts is heated by a magnetic induction field to conduct heat through one part to the sealable interface between the plastic parts. Even more particularly, the present invention relates to processes for sealing an inner bag to an inner side wall of an outer container.

BACKGROUND OF THE INVENTION

Induction sealing plastic parts together by heating metal embedded in one of the plastic parts, or by heating metal components clamping the parts together, is old in the art. Heat is developed by generating a high frequency oscillating magnetic field in the presence of the metal. Depending on the metal, either eddy current losses or magnetic hysteresis losses are believed responsible for heating the metal. Heat from the metal is then conducted through the plastic parts to their sealable interface. Plastic melting occurs from the conducted heat. If the plastic materials are compatible and sufficient pressure is applied, the plastic parts can be fusion welded together. Once the magnetic induction field is removed, the heat may be dissipated from the sealable interface through the metal contacting the plastic parts. Cooling the sealable interface under pressure is generally required to produce a strong seal. The great benefit of the induction heating process is that heat can be quickly generated in low mass metal dies so that high production rates can be achieved.

Squeezebottle dispensers having fluid-containing, flexible inner bags sealed within them are also common in the art. When such a dispenser is squeezed, fluid is forced from the bag through a discharge opening at the top of the dispenser. Valving in the dispenser enables air to be compressed within the squeezebottle during squeezing, but valving then allows air to vent into the bottle to replace the dispensed fluid after the squeezebottle is released. Repeated squeezing cycles cause the bag to collapse around the fluid within the squeezebottle as the bag empties.

A problem with such dispensers is that a bag tends to collapse most quickly near its discharge opening. This is believed due to higher velocity fluid flow at the discharge opening causing lower static pressure there. Fluid flow may be choked off from the rest of the bag if the bag collapses prematurely at the discharge opening. To correct this problem, the manner in which the inner bag can collapse is generally controlled. For example, bags may be designed to collapse radially about a perforated diptube connected to the discharge opening. When the fluid is highly viscous like toothpaste, however, diptubes provide too much resistance to fluid flow through them. For fluids having viscosities great enough that the fluid cannot flow under gravity, another collapse control approach is often used. That is, a bag is sealed to the midline circumference of the squeezebottle so that the bag can collapse by inverting axially toward the discharge opening. Bag inversion offers minimum flow resistance.

For squeezebottle dispensers having inner bags which invert toward the discharge opening, there is a construction problem of inserting and sealing a bag inside a squeezebottle. The discharge opening of the squeezebottle is usually smaller in circumference than the inner side wall of the squeezebottle, so that the discharge opening may later be capped with a reasonably sized closure. If the bag is inserted into the squeezebottle from a small diameter discharge opening, it is difficult to insert a sealing tool into the bag to seal the bag to the midline circumference of the squeezebottle. The sealing tool must expand to press the bag against the inner side wall of the squeezebottle. A reliable, high speed method for midline bag sealing, using such an expanding tool, is not currently known.

Alternatively, if the bag is inserted from the opposite end of the squeezebottle, which is usually the bottom of the squeezebottle, the bag must later be filled and sealed closed from the bottom end, and a bottom piece must be added to close the open bottom of the squeezebottle. For example, twisting the open end of the bag after filling and then heat sealing the twisted portion is one approach to closing a filled bag. Closing the bag after filling has been found to be a slow and difficult process.

One solution to the bottom end bag insertion and filling problem for highly viscous fluids is a construction that seals a half bag to the midline circumference of a squeezebottle. A half bag may be inserted from the open bottom of the squeezebottle with its closed end at the discharge opening of the squeezebottle. After sealing the open end of the half bag to the midline circumference of the squeezebottle, the half bag may then be inverted so that its closed end is positioned at the bottom of the squeezebottle. Filling may then be accomplished from the discharge opening of the dispenser. Such a construction requires a complete seal around the midline circumference of the squeezebottle.

The half bag approach enables conventional high speed filling without subsequent bag closing and sealing. However, the half bag approach also requires the formation and handling of a half bag and the inversion of the half bag after sealing it to the squeezebottle. Bag forming and internal sealing operations are complex and difficult even when performed manually.

SUMMARY OF THE INVENTION

One preferred embodiment of the present invention is a method for sealing a thin plastic bag to an inwardly tapered, continuous inner side wall of an outer plastic container. The outer plastic container has an open bottom end, a discharge opening, and a midpoint. The method comprises steps which include placing the plastic bag over a non-metallic mandrel. The mandrel has a top end and a metal member positioned inside the thin plastic bag. The plastic bag has a closed end at the top end of the mandrel. Another step inserts the top end of the mandrel with the plastic bag placed over it into the open bottom end of the outer plastic container. The metal member of the mandrel is adapted to wedge the plastic bag against the inwardly tapered, continuous inner side wall of the outer plastic container, in order to create a sealable interface between the thin plastic bag and the continuous inner side wall of the outer plastic container near the midpoint. Still another step generates a magnetic induction field near and preferably outside of the metal member. The field has a strength that generates sufficient heat in the metal member so that the heat from the metal member may be conducted through the thin plastic bag to the continuous inner side wall of the outer plastic container to melt the sealable interface therebetween.

This embodiment may further comprise steps including removing the magnetic induction field, retaining the mandrel inserted until the metal member cools sufficiently to be withdrawn without disturbing the sealable interface, and then withdrawing the mandrel from the thin plastic bag. The step of withdrawing the mandrel from the thin plastic bag may further include a step which inverts the thin plastic bag by an inverting means as the mandrel is withdrawn. That inverting means may include vaccum from holes in the top of the mandrel connected to a vacuum source, or just the rapid withdrawal of the mandrel. When the mandrel is rapidly withdrawn, the closed end of the bag maintains a substantially air-tight fit with the top end of the mandrel until the mandrel is nearly withdrawn, and the rapid withdrawal provides sufficient inertia to fully invert the bag.

The step of placing the plastic bag over a non-metallic mandrel may be accomplished by thermoforming the plastic bag onto the mandrel.

The thin plastic bag may comprises a half bag, which has an open end just below the midpoint of the outer plastic container when the mandrel is fully inserted into the outer plastic container.

The metal member may comprise a continuous metal ring wrapped circumferentially about the non-metallic mandrel so that the sealable interface is substantially uninterrupted.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

FIG. 4 is a partial front elevational view of the oval squeezebottle of FIG. 2 showing the induction coil at the midpoint of the bottle; and FIG. 5 is a sectioned partial front elevational view, taken along section line 5—5 of FIG. 2, showing the mandrel withdrawn from the half bag sealed to the midpoint of the squeezebottle and the bag inverted with its closed end at the bottom of the squeezebottle.

DETAILED DESCRIPTION OF THE INVENTION

Figure 1:
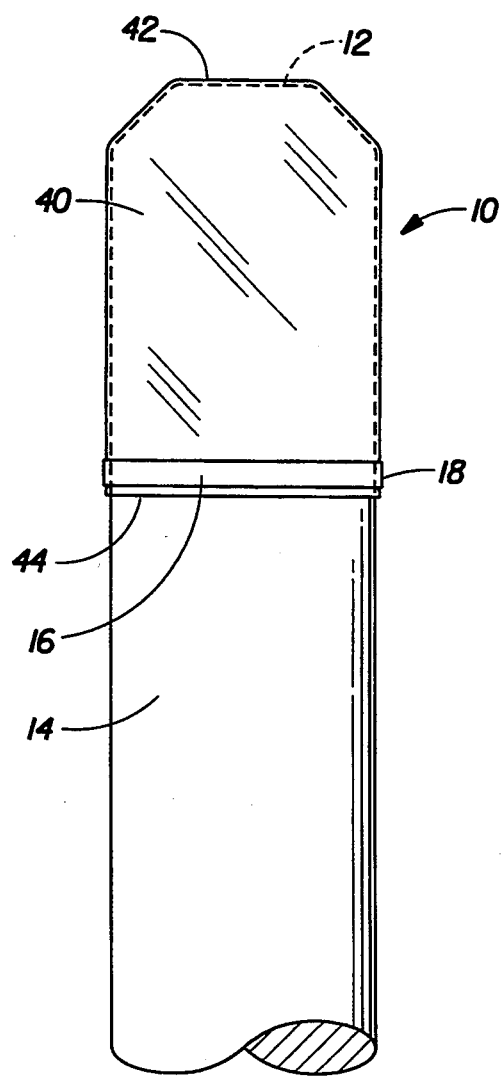
FIG. 1 is a partial front elevational view showing a half bag placed over an upright mandrel having a metal ring positioned just inside the open end of the bag.
Figure 3:
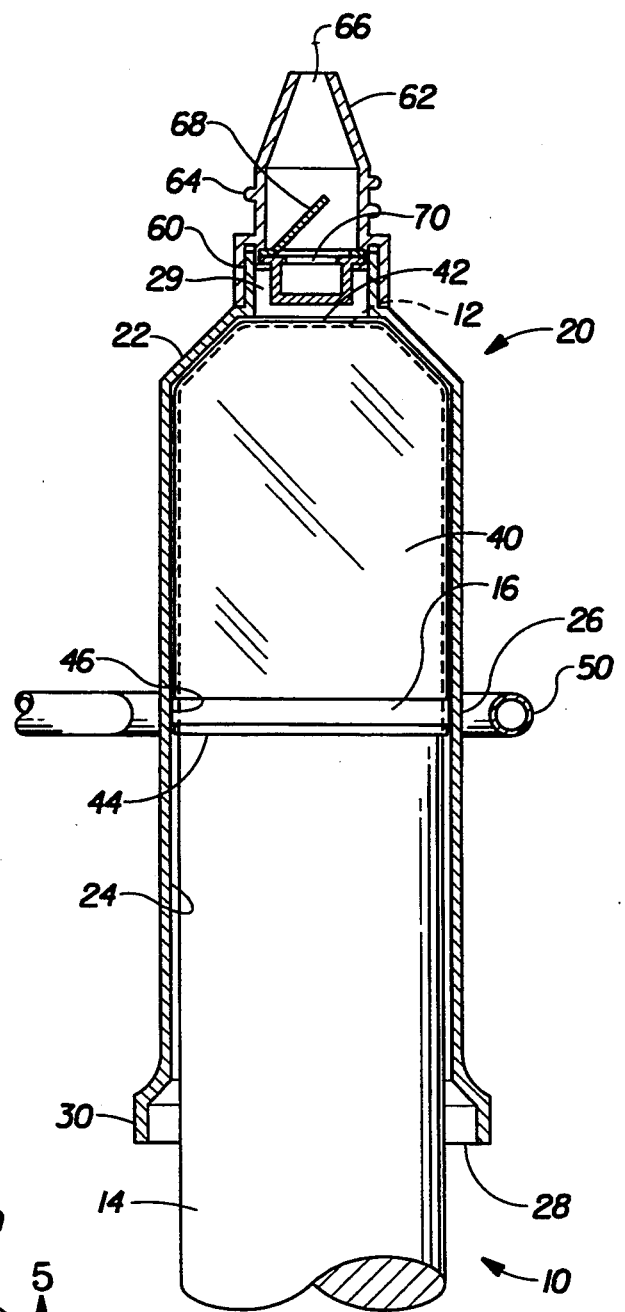
FIG. 3 is a sectioned partial front elevational view, taken along section line 3—3 of FIG. 2, showing the mandrel and bag of FIG. 1 inserted into the open end of an outer squeezebottle.

Referring now to the drawings, and more particularly to FIG. 1, there is shown a first preferred mandrel of the present invention, which provides a tool for induction sealing an inner bag to an outer container, and is generally indicated as 10. Mandrel 10 is typically a solid piece of non-metallic material, shaped to slidably fit inside an outer container 20, which is seen in FIG. 3. Outer container 20 is preferably made of plastic and has a shoulder 22, a continuous inner side wall 24 which depends from shoulder 22, and a midpoint 26 located at about half the length of outer container 20. Outer container 20 also has an open bottom end 28, a discharge opening 29, and a flared base 30.

Mandrel 10 has a top end 12 shaped to fit against the inside of shoulder 22 of outer container 20. Preferably outer container 20 and mandrel 10 have substantially the same cross-sections, which are circular, oval, or otherwise convex in shape. Preferably mandrel 10 and continuous inner side wall 24 both taper gently inward toward top end 12 and shoulder 22. Mandrel 10 also has an outer surface 14 and a metal member 16, preferably in the form of a continuous band or ring of nickel-chromium (nichrome), connected to it. Metal member 16 is preferably wrapped circumferentially about mandrel 10 at a distance from top end 12 about equal to half the length of outer container 20. Metal member 16 has an outer sealing surface 18 which is slightly greater in circumference than outer surface 14. When mandrel 10 is first inserted into open bottom end 28 of outer container 20, there is no contact between mandrel 10 and continuous inner sidewall 24 of outer container 20. When mandrel 10 is fully inserted, metal ring 16 contacts continuous inner side wall 24 just before top end 12 contacts shoulder 22. Because of the gentle taper, typically about a 0.5° to 1° incuded angle, metal ring 16 becomes wedged against inner side wall 24 approximately at the midpoint 26 of outer container 20.

Placed on top end 12 of mandrel 10 is a thin plastic bag 40. Thin plastic bag 40 has a closed end 42 and an open end 44. Closed end 42 is preferably shaped to fit snuggly against top end 12 of mandrel 10 in a substantially air-tight manner. When thin plastic bag 40 is placed fully onto mandrel 10, open end 44 preferably extends just below metal ring 16. Since thin plastic bag 40 is roughly half the length of outer container 20, thin plastic bag 40 is termed a "half bag". The upward motion of mandrel 10 into outer container 20 causes thin plastic bag 40 to be wedged against inwardly tapered, continuous inner side wall 24 by metal member 16 near midpoint 26. A heat sealable interface 46 is created between thin plastic bag 40 and continuous inner side wall 24 where metal member 16 wedges the two together.

Figure 2:
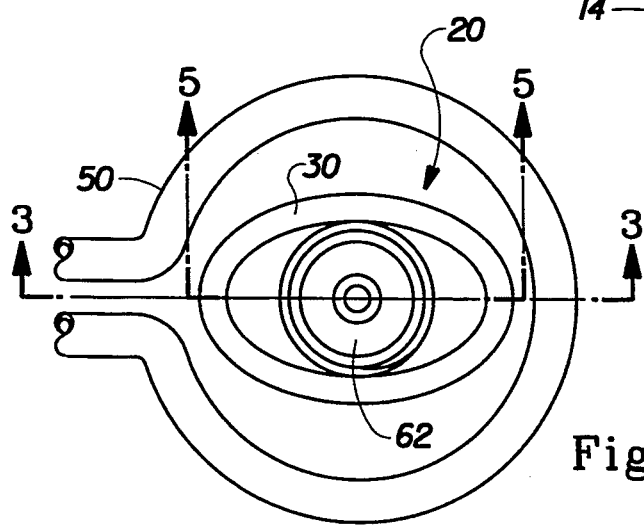
FIG. 2 is a top plan view of an oval squeezebottle set inside a circular induction coil.

FIG. 2 shows oval outer plastic container 20 placed centrally inside at least one loop of an induction coil 50. Induction coil 50 is preferably a piece of copper tubing connected electrically to a Radio Frequency power generator, not shown. Induction coil 50 is also connected to a source of cooling water not shown. Cooling water passes through the inside of induction coil 50 while radio frequency power flows through and along the outer surface of induction coil 50. The effect of radio frequency power flowing through induction coil 50 is to create a magnetic induction field, not shown, around induction coil 50. Plastic outer container 20 does not contact induction coil 50; however, the proximity of induction coil 50 to outer container 20 is such that outer container 20 is fully within the magnetic induction field near midpoint 26. Alternatively, an induction field could be generated inside mandrel 10 if the size of mandrel 10 permitted.

Induction coil 50, placed near midpoint 26, generates a magnetic induction field outside outer container 20 reaching at least into metal member 16. The magnetic induction field is not disturbed by nor does it influence the non-metallic components within its range. However, metallic components, such as metal member 16 are heated by the field via magnetic hysteresis losses and/or eddy current losses. The lower the mass of the metal member 16 and the stronger the field, the more rapidly heating occurs. Different metals heat at different rates.

When metal member 16 is heated, its heat is conducted through thin plastic bag 40 to continuous inner side wall 24 of plastic outer container 20 at their sealable interface 46. Plastic melting occurs at the sealable interface 46 all the way around the metal member, and the two plastics are welded together if they are compatible. Some heat is also conducted into non-metallic mandrel 10, but its mass is so great compared to that of thin plastic bag 40 and plastic outer container 20 that no melting occurs at the mandrel. Mandrel material is designed to withstand cyclic heating. The level of power delivered to induction coil 50 is controlled by a control means, not shown, such that it is turned on for only enough time to heat metal member 16 sufficiently to transfer its heat to sealable interface 46 and cause melting at the interface, but without melting through the continuous inner side wall 24 of outer container 20. Once metal member 16 has been sufficiently heated, the control means turns power off to induction coil 50. Metal member 16 immediately begins to cool. Melted sealable interface 46 also cools and solidifies as heat is conducted from interface 46 to the metal member 16 and then to the non-metallic mandrel 10. Although cooling is somewhat slower than heating, cooling only needs to occur until the weld at sealable interface 46 is stable enough to permit the removal of mandrel 10. After sufficient cooling, mandrel 10 is removed from outer container 20.

Also shown in FIG. 3 is a threaded finish 60 extending upward from shoulder 22 surrounding discharge opening 29 of outer container 20. Threaded onto finish 60 is nozzle 62. Nozzle 62 has inner threads mating with those of finish 60. Nozzle 62 also has external threads 64 for attachment of a threaded overcap, not shown. Nozzle 62 has an orifice 66 at its upper end. Internal to nozzle 62 is a flapper valve 68 and a valve seat 70, preferably snap-fit into nozzle 62. Flapper valve 68 is a one way product valve which communicates with the inside of outer container 20 to enable fluid to flow from container 20 to orifice 66. Flapper valve 68 resists the flow of fluid or air back into container 20. Such valving is is commonly desired in squeezebottle dispensers containing product filled bags.

FIG. 4 merely shows the outside of outer container 20 placed within induction coil 50. Mandrel 10 is shown inserted into outer container 20. Preferably, after inner bag 40 is sealed to continuous inner side wall 24, there is no evidence of the seal showing at the outer surface of outer container 20.

FIG. 5 shows outer container 20 with nozzle 62 removed for filling outer container 20 with fluid after bag 40 is sealed therein. Also, FIG. 5 shows mandrel 10 as it is withdrawn from thin plastic bag 40 and plastic outer container 20. A fully circumferential seal between thin plastic bag 40 and inner side wall 24 has been formed at sealable interface 46. As mandrel 10 is withdrawn, it preferably pulls closed end 42 of thin plastic bag 40 with it. Vacuum holes 72 may be drilled into mandrel 10 and connected to a source of vacuum not shown. The source of vacuum is turned on when mandrel 10 is withdrawn, and then vacuum holes 72 are exhausted after thin plastic bag 40 has been fully inverted about the seal at midpoint 26, or turned inside out to where the closed end of the bag is at open bottom end 28 of the outer container. FIG. 5 shows thin plastic bag 40 fully inverted.

If a continuous, uninterrupted seal is indeed formed at midpoint 26, and thin plastic bag 40 is fully inverted, then outer container 20 is ready to be filled. Nozzle 62 can be removed for filling outer container 20. By having a half bag inverted inside outer container 20, significant bag material is saved compared to constructions in which a full bag is placed inside the outer container. Outer container 20 is preferably a squeezebottle. That is, inner side walls 24 are deformable. The purpose for sealing a half bag into the squeezebottle is to construct a pump that is capable of dispensing fluid from any orientation and which is always primed. To complete the pump construction, a bottom plate, not shown, is sealed to outer container 20 after mandrel 10 is withdrawn and bag 40 is filled. A bottom plate would preferably have a vent valve, not shown, to permit air to be compressed when squeezebottle 20 is squeezed, but would permit air to be vented into squeezebottle 20 upon release. Such a construction enables bag 40 to collapse axially, reinverting as product is dispensed.

Thin plastic bag 40 may be thermoformed onto mandrel 10 from a heated plastic film rather than forming a bag separately and then placing it onto the mandrel. Alternatively, vacuum gripping for inverting thin plastic bag 40 may be replaced with mechanical grippers on top end 12 of mandrel 10. Another alternative is to thermoform thin plastic bag 40 over mandrel 10 such that dovetail notches, or similarly shaped undercuts, on top end 12 grip thin plastic bag 40 when mandrel 10 is withdrawn, thereby frictionally inverting the bag, but releasing it after full inversion. In yet another alternative mandrel 10 may be fully withdrawn in less than one second from thermoformed bag 40. The lack of an air gap between mandrel 10 and bag 40 enables mandrel 10 to invert bag 40 as it is withdrawn. That is, there is a substantially air-tight fit between mandrel 10 and the inside of bag 40 when mandrel 10 first moves. Closed end 42 of bag 40 follows mandrel 10 until bag 40 is nearly inverted. If withdrawal is rapid enough, bag 40 will be completely inverted. Even if bag 40 is formed separately from mandrel 10, it is believed that latter this inversion alternative will work reliably.

In a particularly preferred embodiment of the method for induction sealing an inner bag to an outer container, thin plastic bag 40 is preferably made from a 4 mil laminate comprising a center layer of 1 mil EVOH and outer layers of linear low density polyethylene. Bag 40 is thermoformed over mandrel 10 by using a VAC thermoformer, model no. R-12, made by Atlas VAC Company of Cincinnati, Ohio. This machine is set at heating temperatures of 130° C. to 140° C. for times ranging from 8 to 16 seconds. The draw ratio is approximately 4:1. Consequently, the closed end 42 of thin plastic bag 40 remains 4 mils thick while the open end 44 is drawn down to about 1 mil thick. Open end 44 is trimmed manually to the desired bag length by pressing a blade against mandrel 10 while rotating the mandrel. Once bag 40 is thermoformed onto mandrel 10, it remains thereon for insertion into outer container 20. Mandrel 10 is cast from Uralite TM, a trademark of Hexel Company of Chatsworth, Calif. Mandrel 10 is cast using the outer container 20 as the mold. Therefore, thin plastic bags 40 which are thermoformed over mandrel 10 fit the inside of outer container 20 very closely. Mandrel 10 has two adjacent parallel nichrome bands, representing metal member 16, which circumscribe the mandrel at a point where the heat seal is to be made. Open end 44 of bag 40 extends from top end 12 of mandrel 10 to just below the second nichrome band. Each band has a width of 3.2 mm and a thickness of 0.15 mm. They are separated by 3.2 mm, and their outer surfaces 18 extend about 0.02 mm outward from outer surface 14 of mandrel 10 all the way around mandrel 10. Each band is coated with about 1 mil of teflon spray to prevent the melted plastic sticking to the bands during sealing. The teflon spray is made by Coating Systems of Harrison, Ohio.

Outer container 20 is preferably a Crest Neat Squeeze ™ toothpaste dispenser, a Trademark of The Procter & Gamble Company of Cincinnati, Ohio. Outer container 20 has continuous inner side wall 24 having an inward taper toward shoulder 22 of about a one degree included angle. Continuous inner side wall has an oval cross-section and is a laminate made of 1 mil EVOH in the center, surrounded by linear low density polyethylene. Inner side wall 24 has a total thickness of approximately 30 mils. When mandrel 10 with bag 40 is wedged inside outer container 20, the pressure exerted by metal member 16 against bag 40 and inner side wall 24 is estimated to be between 75 psi and 100 psi (51,700 N/m$^2$ to 68,900 N/m$^2$) when mandrel 10 is fully inserted.

Outer container 20, bag 40 and inserted mandrel 10 are placed together inside induction coil 50 for induction heat sealing. Although a non-metallic fixture, not shown, is preferably placed over outer container 20 to center it inside an induction coil 50, the fixture preferably plays no role in the sealing of thin plastic bag 40 to continuous inner side wall 24. It is believed that such a fixture would be unnecessary in an automated production line.

Induction sealing coil 50 is preferably rectangular in cross-section, having a height of 3.2 mm, an inner radius of 57 mm, and an outer radius of 73 mm. Induction coil 50 is preferably made of copper and is water cooled when connected to an RF generator, model no. T53-KC-SW, made by Lepel Company of New York, N.Y. The spacing between oval outer container 20 and induction coil 50 varies between 25 mm and 13 mm. Good induction heat seals can be generated with the following RF generator settings: Field power set at 50, grid power set at 50, thereby generating 12 volts and 0.3 amps at the grid and 12 volts and 0.75 amps at the plate. When power is turned on for 0.2 to 0.7 seconds, the temperature in the nichrome rings reaches 200° C. to 220° C., causing melting at sealable interface 46. When mandrel 10 remains inserted for one second after RF generator power is turned off, sufficient cooling occurs for the heat seal to become stable. Thereafter mandrel 10 may be removed without disturbing the seal.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method of sealing a thin plastic bag having an open end to an inwardly tapered, continuous inner side wall of an outer plastic container, said outer plastic container having an open bottom end, a discharge opening and a midpoint, said method comprising the steps of:

a) placing said thin plastic bag over a non-metallic mandrel, said mandrel having a top end and a metal member connected to said non-metallic mandrel, said metal member positioned inside said thin plastic bag, said thin plastic bag having a closed end at said top end of said mandrel;
   b) inserting said top end of said mandrel, having said thin plastic bag placed over said top end, into said open bottom end of said outer plastic container, said metal member wedging said plastic bag against said inwardly tapered, continuous inner side wall of said outer plastic container near said midpoint of said outer plastic container in order to create a sealable interface between said thin plastic bag and said continuous inner side wall of said outer plastic container near said midpoint; and
   c) generating a magnetic induction field outside said metal member, said field having a strength to generate sufficient heat in said metal member so that said heat from said metal member may be conducted through said thin plastic bag to said continuous inner side wall of said outer plastic container to melt said sealable interface therebetween.

2. The method of claim 1 further comprising the steps of:

d) removing said magnetic induction field;
   e) retaining said mandrel inserted in said thin plastic bag until said metal member cools sufficiently to be withdrawn from said thin plastic bag without disturbing said sealable interface; and
   f) withdrawing said mandrel from said thin plastic bag.

3. The method of claim 2 wherein said step of withdrawing said mandrel from said thin plastic bag further comprises the step of inverting said thin plastic bag by an inverting means as said mandrel is withdrawn.

4. The method of claim 3 wherein said inverting means comprises vacuum holes in said top end of said mandrel, said vacuum holes connected to a vacuum from a vacuum source, said vacuum gripping said closed end of said thin plastic bag during mandrel withdrawal.

5. The method of claim 3 wherein said inverting step comprises a rapid withdrawal of said mandrel so that said closed end of said thin plastic bag maintains a substantially air-tight fit with said top end of said mandrel until said mandrel is nearly withdrawn, said rapid withdrawal providing sufficient inertia to fully invert said thin plastic bag.

6. The method of claim 1 wherein said thin plastic bag comprises a half bag, said half bag having an open end just below said midpoint of said outer plastic container when said mandrel is fully inserted into said outer plastic container.

7. The method of claim 1 wherein said metal member comprises a continuous ring wrapped circumfcrentially about said non-metallic mandrel so that said sealable interface is substantially uninterrupted.

8. The method of claim 1 wherein said step of placing said thin plastic bag over a non-metallic mandrel comprises thermoforming said plastic bag onto said mandrel.

9. A method of sealing a thin plastic bag having an open end to an inwardly tapered, continuous inner side wall of an outer plastic container, said outer plastic container having an open bottom end, a discharge opening, and a midpoint, said method comprising the steps of:

a) placing said thin plastic bag over a non-metallic mandrel, said mandrel having a top end and a metal member connected to said non-metallic mandrel, said metal member positioned inside said thin plastic bag, said thin plastic bag having a closed end at said top end of said mandrel;

b) inserting said top end of said mandrel, having said thin plastic bag placed over said top end, into said open bottom end of said outer plastic container, said metal member wedging said plastic bag against said inwardly tapered, continuous inner side wall of said outer plastic container near said midpoint of said outer plastic container in order to create a sealable interface between said thin plastic bag and said continuous inner side wall of said outer plastic container near said midpoint;

c) generating a magnetic induction field near said metal member, said field having a strength to generate sufficient heat in said metal member so that said heat from said metal member may be conducted through said thin plastic bag to said continuous inner side wall of said outer plastic container to melt said sealable interface therebetween;

d) removing said magnetic induction field;

e) retaining said mandrel inserted in said thin plastic bag until said metal member cools sufficiently to be withdrawn from said thin plastic bag without disturbing said sealable interface; and f) withdrawing said mandrel from said thin plastic bag, said withdrawing step adapted to invert said thin plastic bag by an inverting means as said mandrel is withdrawn, and releasing said closed end of said thin plastic bag when it is near said open bottom end of said outer plastic container.

10. The method of claim 9 wherein said inverting means comprises vacuum holes in said top end of said mandrel, said vacuum holes connected to a vacuum from a vacuum source, said vacuum gripping said closed end of said thin plastic bag during mandrel withdrawal.

11. The method of claim 9 wherein said inverting step comprises a rapid withdrawal of said mandrel so that said closed end of said thin plastic bag maintains a substantially air-tight fit with said top end of said mandrel until said mandrel is nearly withdrawn, said rapid withdrawal providing sufficient inertia to fully invert said thin plastic bag.

12. The method of claim 9 wherein said thin plastic bag comprises a half bag, said half bag having an open end just below said midpoint of said outer plastic container when said mandrel is fully inserted into said outer plastic container.

13. The method of claim 9 wherein said metal member comprises a continuous ring wrapped circumferentially about said non-metallic mandrel so that said sealable interface is substantially uninterrupted.

14. The method of claim 9 wherein said step of placing said thin plastic bag over a non-metallic mandrel comprises thermoforming said plastic bag onto said mandrel.

15. A method of sealing a thin plastic bag having an open end to an inwardly tapered, continuous inner side wall of an outer plastic container, said outer plastic container having an open bottom end, a discharge opening, and a midpoint, said method comprising the steps of:

a) thermoforming said thin plastic bag over a non-metallic mandrel, said mandrel having a top end and a continuous metal ring connected to said non-metallic mandrel, said continuous metal ring positioned inside said thin plastic bag, said thin plastic bag having a closed end at said top end of said mandrel;

b) inserting said top end of said mandrel, having said thin plastic bag placed over said top end, into said open bottom end of said outer plastic container, said metal member wedging said plastic bag against said inwardly tapered, continuous inner side wall of said outer plastic container near said midpoint of said outer plastic container in order to create a sealable interface between said thin plastic bag and said inner side wall of said outer plastic container near said midpoint; and c) generating a magnetic induction field near said continuous metal ring, said field having a strength to generate sufficient heat in said continuous metal ring so that said heat from said continuous metal ring may be conducted through said thin plastic bag to said continuous inner side wall of said outer plastic container to melt said sealable interface therebetween.

16. The method of claim 15 further comprising the steps of:

d) removing said magnetic induction field;

e) retaining said mandrel inserted in said thin plastic bag until said continuous metal ring cools sufficiently to be withdrawn from said thin plastic bag without disturbing said sealable interface; and f) withdrawing said mandrel from said thin plastic bag.

17. The method of claim 16 wherein said step of withdrawing said mandrel from said thin plastic bag further comprises the step of inverting said thin plastic bag by an inverting means as said mandrel is withdrawn.

18. The method of claim 17 wherein said inverting means comprises vacuum holes in said top end of said mandrel, said vacuum holes connected to a vacuum from a vacuum source, said vacuum gripping said closed end of said thin plastic bag during mandrel withdrawal.

19. The method of claim 17 wherein said inverting step comprises a rapid withdrawal of said mandrel so that said closed end of said thin plastic bag maintains a substantially air-tight fit with said top end of said mandrel until said mandrel is nearly withdrawn, said rapid withdrawal providing sufficient inertia to fully invert said thin plastic bag.

20. The method of claim 15 wherein said thin plastic bag comprises a half bag, said half bag having an open end just below said midpoint of said outer palstic container when said mandrel is fully inserted into said outer plastic container.

* * * * *

UNITED STATES PATENT AND TRADEMARK OFFICE
CERTIFICATE OF CORRECTION

PATENT NO. : 5,416,303
DATED : May 16, 1995
INVENTOR(S) : John P. Grooms, Larry J. Mattson It is certified that error appears in the above-identified patent and that said Letters Patent is hereby corrected as shown below:

On title page, in item
  [73] Assignee *delete "Proctor" and insert therefor - -Procter- -*.

Signed and Sealed this

Sixth Day of October, 1998

Attest:

BRUCE LEHMAN

Attesting Officer          Commissioner of Patents and Trademarks